United States Patent
Nakayama et al.

(10) Patent No.: US 11,777,090 B2
(45) Date of Patent: Oct. 3, 2023

(54) POSITIVE ELECTRODE ACTIVE MATERIAL FOR NONAQUEOUS ELECTROLYTE SECONDARY BATTERIES, METHOD FOR PRODUCING SAME, AND NONAQUEOUS ELECTROLYTE SECONDARY BATTERY

(71) Applicant: SUMITOMO METAL MINING CO., LTD., Tokyo (JP)

(72) Inventors: Tomoko Nakayama, Niihama (JP); Jun Yokoyama, Tokyo (JP); Tetsufumi Komukai, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 17/864,999

(22) Filed: Jul. 14, 2022

(65) Prior Publication Data

US 2022/0352515 A1 Nov. 3, 2022

Related U.S. Application Data

(63) Continuation of application No. 16/622,979, filed as application No. PCT/JP2018/024057 on Jun. 25, 2018, now Pat. No. 11,424,448.

(30) Foreign Application Priority Data

Jun. 28, 2017 (JP) .................................. 2017-125792

(51) Int. Cl.
*H01M 4/00* (2006.01)
*H01M 4/525* (2010.01)
(Continued)

(52) U.S. Cl.
CPC ........... *H01M 4/525* (2013.01); *H01M 4/133* (2013.01); *H01M 4/505* (2013.01); *H01M 2004/027* (2013.01); *H01M 2004/028* (2013.01)

(58) Field of Classification Search
CPC .. C01P 2004/32; C01P 2002/72; Y02E 60/10; C01G 53/42; H01M 2004/027; H01M 4/505; H01M 2004/028
See application file for complete search history.

(56) References Cited

U.S. PATENT DOCUMENTS 10,601,038 B2   3/2020   Iwanaga et al.
2007/0231691 A1  10/2007  Abe et al.
(Continued)

FOREIGN PATENT DOCUMENTS

JP   05-242891 A    9/1993
JP   2003-017054 A  1/2003
(Continued)

OTHER PUBLICATIONS

International Search Report dated Aug. 7, 2018, issued for PCT/JP2018/024057.
(Continued)

*Primary Examiner* — Cynthia H Kelly
*Assistant Examiner* — Monique M Wills
(74) *Attorney, Agent, or Firm* — Locke Lord LLP; James E. Armstrong, IV; Nicholas J. DiCeglie, Jr.

(57) ABSTRACT

Provided is a positive electrode active material for a nonaqueous electrolyte secondary battery including a LiNi composite oxide having low internal resistance and excellent thermal stability. The positive electrode active material is obtained by performing a water washing process using a water spray on a LiNi composite oxide powder obtained by a firing step until the filtrate has an electric conductivity of 30 to 60 mS/cm, and then dried, where the LiNi composite oxide is represented by the composition formula (1): $Li_b Ni_{1-a}M1_a O_2$, where M1 represents at least one kind of element selected from transition metal elements other than (Continued)

Ni, group 2 elements, and group 13 elements, and $0.01 \leq a \leq 0.5$, and $0.85 \leq b \leq 1.05$.

7 Claims, 1 Drawing Sheet

(51) Int. Cl.
  *H01M 4/133* (2010.01)
  *H01M 4/505* (2010.01)
  *H01M 4/02* (2006.01)

(56) References Cited

U.S. PATENT DOCUMENTS

| | | |
|---|---|---|
| 2011/0281168 A1 | 11/2011 | Watanabe et al. |
| 2013/0119307 A1 | 5/2013 | Watanabe et al. |
| 2014/0186709 A1 | 7/2014 | Iwanaga et al. |
| 2016/0118656 A1 | 4/2016 | Nakayama et al. |
| 2017/0358798 A1* | 12/2017 | Kageura ............... H01M 4/525 |

FOREIGN PATENT DOCUMENTS

| | | |
|---|---|---|
| JP | 2007-273108 A | 10/2007 |
| JP | 2008-277087 A | 11/2008 |
| JP | 2009-140787 A | 6/2009 |
| JP | 2009-140909 A | 6/2009 |
| JP | 2010-064944 A | 3/2010 |
| JP | 2012-17253 A | 1/2012 |
| JP | 5894388 B2 | 3/2016 |
| JP | 2016-084279 A | 5/2016 |
| WO | 2013/015007 A1 | 1/2013 |
| WO | 14/189108 A1 | 11/2014 |

OTHER PUBLICATIONS

Zenichiro Takehara, "High-density Lithium Secondary Battery", Techno System Co., Ltd., Mar. 1998, pp. 61-83, Information Sheet and a partial English translation thereof.

"Summary of the 47th Battery Discussion Meeting", Battery Engineering Committee of the Electrochemical Society of Japan, Nov. 2006, pp. 326-327 and English translation thereof.

Notice of Submission of Publications dated Jun. 8, 2021 in the counterpart Japanese patent application.

* cited by examiner

POSITIVE ELECTRODE ACTIVE MATERIAL FOR NONAQUEOUS ELECTROLYTE SECONDARY BATTERIES, METHOD FOR PRODUCING SAME, AND NONAQUEOUS ELECTROLYTE SECONDARY BATTERY

CROSS-REFERENCE TO RELATED APPLICATIONS

This Application is a Continuation of application Ser. No. 16/622,979 filed on Dec. 16, 2019. Application PCT/JP2018/024057 claims priority from Application 2017-125792 filed on Jun. 28, 2017 in Japan. The entire contents of these applications are incorporated herein by reference in their entirety.

TECHNICAL FIELD

The present invention relates to a positive electrode active material for nonaqueous electrolyte secondary batteries, a method for producing the same, and a nonaqueous electrolyte secondary battery using the positive electrode active material for a nonaqueous electrolyte secondary battery as a positive electrode material.

BACKGROUND ART

In recent years, with the rapid expansion of small electronic devices such as mobile phones, notebook computers and the like, demand for nonaqueous electrolyte secondary batteries as chargeable and dischargeable power sources has increased rapidly. As the positive electrode active material used for a nonaqueous electrolyte secondary battery, there is lithium cobalt composite oxide typified by lithium cobalt oxide ($LiCoO_2$), lithium nickel composite oxide typified by lithium nickel oxide ($LiNiO_2$), and lithium manganese composite oxides typified by lithium manganese oxide ($LiMn_2O_4$), and the like.

Lithium cobalt composite oxide has a problem in that cobalt is used as a main component, and the reserves of cobalt are small, cobalt is expensive and the supply is unstable, and there are large fluctuations in the price of cobalt. For this reason, lithium nickel composite oxide or lithium manganese composite oxide that includes relatively inexpensive nickel or manganese as a main component has attracted attention from the aspect of cost.

However, although lithium manganese composite oxide is superior to lithium cobalt composite oxide in thermal stability, the charge and discharge capacity is very small compared to other materials, and the charge and discharge cycle that affects the battery life is also very inferior, so, since the characteristics are very inferior, there are many practical problems for using lithium manganese composite oxide as a positive electrode material for a secondary battery. On the other hand, lithium nickel composite oxide exhibits a larger charge and discharge capacity than lithium cobalt composite oxide, so is expected to become a positive electrode material that is able to provide a secondary battery that is inexpensive and has a high energy density.

Lithium nickel oxide is usually produced by mixing a lithium compound with a nickel compound such as nickel hydroxide, nickel oxyhydroxide or the like, and then firing a mixture thereof. Lithium nickel oxide includes a powder in which primary particles are monodispersed, or a powder of secondary particles, which are aggregates of primary particles and have voids; however, there is a disadvantage in that both of these are inferior to lithium cobalt oxide in thermal stability in the charged state. In other words, pure lithium nickel oxide has problems in regard to thermal stability, charge and discharge cycle characteristics, and the like, and cannot be used as a positive electrode material for a practical secondary battery. This is because the stability of the crystal structure in the charged state in which lithium is extracted from the crystal, is lower than that of lithium cobalt oxide.

As a solution to this problem, improvements have been made to the thermal stability and charge and discharge cycle characteristics of lithium nickel composite oxides by obtaining lithium nickel composite oxide by substituting a part of nickel with another transition metal element such as cobalt, manganese, iron, or the like, or with different elements such as aluminum, vanadium, tin, or the like, and by stabilizing the crystal structure in a state where lithium is extracted by charging (refer to JPH05-242891A, and "High-density Lithium Secondary Battery", Zenichiro Takehara, Techno System Co., Ltd., March 1998, p. 61-p. 78).

However, in a method of replacing a part of nickel with another element in this way, a small amount of element substitution does not lead to a sufficient improvement in thermal stability, on the other hand, a large amount of element substitution causes a decrease in the capacity of the positive electrode active material, so there is a problem in that the superiority of the lithium nickel composite oxide as a positive electrode material cannot be fully utilized.

In addition, when lithium nickel composite oxide is used as is after synthesis thereof, the original battery performance cannot be sufficiently exhibited during charging and discharging due to the effects of lithium carbonate and lithium sulfate remaining at the grain boundaries and the like, and for this reason, conventionally, impurities such as lithium carbonate, lithium sulfate and the like are removed from the synthesized lithium nickel composite oxide by washing with water (refer to JP 2003-017054A). Moreover, by washing away impurities on the surface of the lithium nickel composite oxide by a water washing process, the true specific surface area may be obtained, and by using this true specific surface area as an index, it is possible to appropriately improve the thermal stability and capacity of the lithium nickel composite oxide. From this aspect as well, this kind of water washing process is regarded as an effective method when producing lithium nickel composite oxide (refer to JP 2007-273108A).

However, even in these cases, there are problems in that the true cause and mechanism of the effect on the battery performance due to the presence of lithium carbonate and lithium sulfate has not been fully made clear, the removal of impurities and control of specific surface area alone cannot ensure sufficient capacity, output, and excellent thermal stability, and the performance of a secondary battery using lithium nickel composite oxide as the positive electrode material cannot be fully utilized.

On the other hand, in the synthesis of a lithium nickel composite oxide, an alkali metal element such as lithium hydroxide (LiOH) or the like is used as a raw material; however, during the synthesis, the alkali metal element reacts with carbon dioxide gas and produces an alkali metal carbonate (for example, $Li_2CO_3$), causing a problem in that gas is generated at a high temperature and causes the battery to expand (refer to "High-density Lithium Secondary Battery"). In addition, a lithium nickel composite oxide has a strong atmosphere sensitivity, so there is a concern that lithium hydroxide remaining on the surface after the synthesis will cause carbonation, and that lithium carbonate will be further generated in the process until the positive electrode is completed (refer to "Summary of the 47th Battery Discussion Meeting", Battery Engineering Committee of the Electrochemical Society of Japan, November 2006, p. 326-p. 327). In the improvement of the properties of lithium nickel composite oxide by the water washing process described above, although improvement of the thermal stability of lithium nickel composite oxide by removing surface deposits and controlling the specific surface area has been studied, no consideration has been given to the problem of battery expansion due to gas generation.

Various methods for evaluating gas generation of a positive electrode active material have been proposed as countermeasures against the problem of battery expansion due to gas generation. For example, JP 2009-140787A discloses suppressing gas generation at high temperatures while improving the output characteristics of a positive electrode active material by regulating the amount of water-soluble alkali based on the correlation between the water-soluble alkali content present on the surface of the positive electrode active material and the amount of gas generated at high temperature. On the other hand, JP 2008-277087A discloses suppression of the amount of carbon dioxide gas generated in positive electrode active material to be within a specified range based on the correlation between the amount of lithium carbonate on the surface of the positive electrode active material and the expansion rate of the secondary battery. Moreover, J P 2009-140909A discloses measuring the amount of carbon dioxide gas generated when a lithium nickel composite oxide is heated to 200° C. to 1500° C. in an inert gas, and selecting the lithium nickel composite oxide according to that amount of carbon dioxide gas.

PRIOR ART DOCUMENTS

Patent Literature

Patent Literature 1: JPH05-242891A
Patent Literature 2: JP 2003-017054A
Patent Literature 3: JP 2007-273108A
Patent Literature 4: JP 2009-140787A
Patent Literature 5: JP 2008-277087A
Patent Literature 6: JP 2009-140909A Non-Patent Literature Non-Patent Literature 1: "High-density Lithium Secondary Battery", Zenichiro Takehara, Techno System Co., Ltd., March 1998, p. 61-p. 78
Non-Patent Literature 2: "Summary of the 47th Battery Discussion Meeting", Battery Engineering Committee of the Electrochemical Society of Japan, November 2006, p. 326-p. 327

SUMMARY OF INVENTION

Problem to be Solved by the Invention

However, there is a problem in that JP 2009-014078A only specifies a water-soluble alkali component indicating lithium hydroxide on the surface, and does not specify a lithium carbonate component that is a cause of high-temperature gas generation. On the other hand, there is a problem in that JP 2008-277087A and JP 2009-140909A only specify lithium carbonate content on the surface, and do not specify lithium hydroxide content that may change to lithium carbonate in the process up to the completion of the positive electrode.

Therefore, an object of the present invention is to solve such problems in the related art, while elucidating the true cause and mechanism of poor battery performance for a positive electrode active material that includes lithium nickel composite oxide, and provide: a positive electrode active material for a nonaqueous electrolyte secondary battery that achieves both high capacity and excellent thermal stability, and further obtains high output; a production method of that positive electrode active material; and a nonaqueous electrolyte secondary battery that uses this positive electrode active material in the positive electrode, and is capable of high capacity, high output, and a high degree of safety.

Means for Solving the Problems

The inventors, in order to accomplish the objects described above, performed extensive research on a positive electrode active material for a nonaqueous electrolyte secondary battery comprising a lithium nickel composite oxide and on a method for producing the same, and as a result discovered that the battery capacity and output characteristics of the positive electrode active material, and the mechanism of gas generation at high temperature are strongly affected by lithium carbonate present on the surface of lithium nickel composite oxide particles, and found that by controlling the carbon content (TC) of the lithium nickel composite oxide having a correlation with the amount of lithium carbonate to a specific value or less, a positive electrode active material having a low internal resistance and a constant specific surface area may be obtained; and by using this positive electrode active material as a positive electrode material for a nonaqueous electrolyte secondary battery, a nonaqueous electrolyte secondary battery having high capacity and high output, as well as suppressed gas generation at high temperatures, and excellent thermal stability may be obtained.

In addition, the inventors discovered that in order to control the carbon content (TC) of the lithium nickel composite oxide having a correlation with the amount of lithium carbonate present on the particle surface of the lithium nickel composite oxide to a specific value or less, it is extremely important to wash the fired powder under specific conditions, and in doing so, a lithium nickel composite oxide having excellent characteristics may be obtained as a positive electrode active material for a nonaqueous electrolyte secondary battery.

Based on such knowledge, the inventors were able to accomplish the present invention.

In other words, the present invention relates to a positive electrode active material for a nonaqueous electrolyte secondary battery that comprises lithium nickel composite oxide represented by a composition formula (1):

$$\text{Composition formula: } Li_bNi_{1-a}M1_aO_2 \quad (1),$$

where M1 represents at least one kind of element selected from transition metal elements other than Ni, group 2 elements, and group 13 elements, $0.01 \leq a \leq 0.5$, and $0.85 \leq b \leq 1.05$.

Particularly, the feature of the positive electrode active material for a nonaqueous electrolyte secondary battery of the present invention is a specific surface area of 0.5 $m^2$/g to 2.05 $m^2$/g, and a carbon content (TC) with respect to the total amount of lithium nickel composite oxide of 0.08% by mass or less.

Preferably, the lithium amount of a lithium compound present on a surface of the lithium nickel composite oxide (surface lithium amount) is 0.10% by mass or less with respect to the total amount of the lithium nickel composite oxide.

In addition, preferably the moisture content of the lithium nickel composite oxide powder is 0.2% by mass or less.

Preferably, the lithium nickel composite oxide has a composition represented by a composition formula (2):

$$\text{Composition formula: } Li_bNi_{1-x-y-z}Co_xAl_yM2_zO_2 \quad (2),$$

where M2 represents at least one kind of element selected from the group consisting of Mn, Ti, Ca, and Mg, $0.85 \le b \le 1.05$, $0.05 \le x \le 0.30$, $0.01 \le y \le 0.1$, and $0 \le z \le 0.05$.

Preferably, the carbon content (TC) is in a range of 0.01% by mass to 0.04% by mass.

Preferably, the lithium amount (surface lithium amount) is a mass ratio of lithium to the lithium nickel composite oxide determined by adding the lithium nickel composite oxide to solution to make a slurry, after which an amount of alkali content (lithium compound) in the slurry is found by titration with acid using the pH of the slurry as an index, and then performing lithium conversion from the amount of alkali content. In this case, the alkali content in the slurry is considered to correspond to the lithium compound present on the surface of the lithium nickel composite oxide.

Preferably, the acid used for the titration is at least one kind selected from a group consisting of hydrochloric acid, sulfuric acid, nitric acid, and organic acid.

Moreover, the present invention relates to a method of producing a positive electrode active material for a nonaqueous electrolyte secondary battery. Particularly, the production method of the present invention is for producing a positive electrode active material for a nonaqueous electrolyte secondary battery according to the present invention described above, and that production method includes:

(i) a step of preparing a fired powder of the lithium nickel composite oxide by mixing a nickel composite compound selected from among nickel composite hydroxide, nickel oxy composite hydroxide, and nickel composite oxide, and having nickel as a main component and at least one kind of element selected from transition metal elements other than nickel, group 2 elements, and group 13 elements as a subcomponent, with a lithium compound, and then firing a mixture thereof in an oxygen atmosphere under firing conditions where the maximum temperature is in a range of 650° C. to 850° C., the lithium nickel composite oxide being represented by the composition formula (3):

$$Li_bNi_{1-a}O_2 \quad (3),$$

where M1 represents at least one kind of element selected from transition metal elements other than Ni, group 2 elements, and group 13 elements, $0.01 \le a \le 0.5$, and $0.95 \le b \le 1.13$; and (ii) a step of preparing a powder of the lithium nickel composite oxide by performing a water washing process of the fired powder with spraying the fired powder with water in a temperature range of 10° C. to 40° C., and preferably in a temperature range of 15° C. to 30° C., until the electric conductivity (conductivity) of the filtrate is in a range of 30 S/cm to 60 mS/cm, and preferably 35 S/cm to 55 mS/cm, to make a fired powder slurry, then performing filtration of the fired powder slurry until the moisture content of the adhered water remaining on the particle surface of the fired powder after washing is 10% by mass or less, and preferably in a range of 1% by mass to 8% by mass, to obtain a filtered powder, and performing drying of the filtered powder (water washing process and drying process of the fired powder).

Preferably, in step (ii), the fired powder slurry has a slurry concentration in a range of 500 g/L to 3000 g/L. Moreover, preferably in step (ii), drying of the filtered powder is performed in a gas atmosphere that does not include a compound component including carbon or a vacuum atmosphere.

Preferably, the nickel composite hydroxide is prepared by dripping an aqueous solution including a nickel compound as a main component and a compound of at least one kind of element selected from transition metal elements other than nickel, group 2 elements, and group 13 elements as a subcomponent, and an aqueous solution including an ammonium ion supplier into a heated reaction tank; and at that time, dripping an aqueous solution of an alkali metal hydroxide in an amount capable of maintaining the alkalinity of the reaction solution.

Preferably, the nickel oxy composite hydroxide is prepared by dripping an aqueous solution including a nickel compound as a main component and a compound of at least one kind of element selected from transition metal elements other than nickel, group 2 elements, and group 13 elements as a subcomponent, and an aqueous solution including an ammonium ion supplier into a heated reaction tank; and at that time, appropriately dripping an aqueous solution of an alkali metal hydroxide in an amount capable of maintaining the alkalinity of the reaction solution, and further adding an oxidizing agent successively.

Note that the nickel composite oxide may be obtained by roasting the nickel composite hydroxide or the nickel oxy composite hydroxide.

Preferably, at least one kind selected from a group including lithium hydroxide, lithium oxyhydroxide, lithium oxide, lithium carbonate, lithium nitrate, and lithium halide is used as the lithium compound.

Preferably, in step (i), a mixing ratio of the nickel composite compound and the lithium compound is adjusted so that a molar ratio of a molar amount of lithium in the lithium compound with respect to a total molar amount of nickel, transition metal element other than nickel, group 2 element, and group 13 element in the nickel composite compound is in a range of 0.95 to 1.13.

Furthermore, the present invention relates to a nonaqueous electrolyte secondary battery. Particularly, the nonaqueous electrolyte secondary battery of the present invention includes a positive electrode, a negative electrode, a separator interposed between the positive electrode and the negative electrode, and a nonaqueous electrolyte, and uses the positive electrode active material for a nonaqueous electrolyte secondary battery of the present invention as the positive electrode material of the positive electrode.

Effect of Invention

With the present invention, a positive electrode active material for a nonaqueous electrolyte secondary battery comprising a lithium nickel composite oxide capable of excellent battery characteristics such as high capacity, excellent thermal stability, and high output when configuring a positive electrode of a nonaqueous electrolyte secondary battery may be provided. In addition, with the present invention, a positive electrode active material for a nonaqueous electrolyte secondary battery capable of providing such excellent battery characteristics may be produced by a simple and highly productive method. Therefore, the industrial value of the present invention is very large.

MODES FOR CARRYING OUT THE INVENTION

Figure 1:
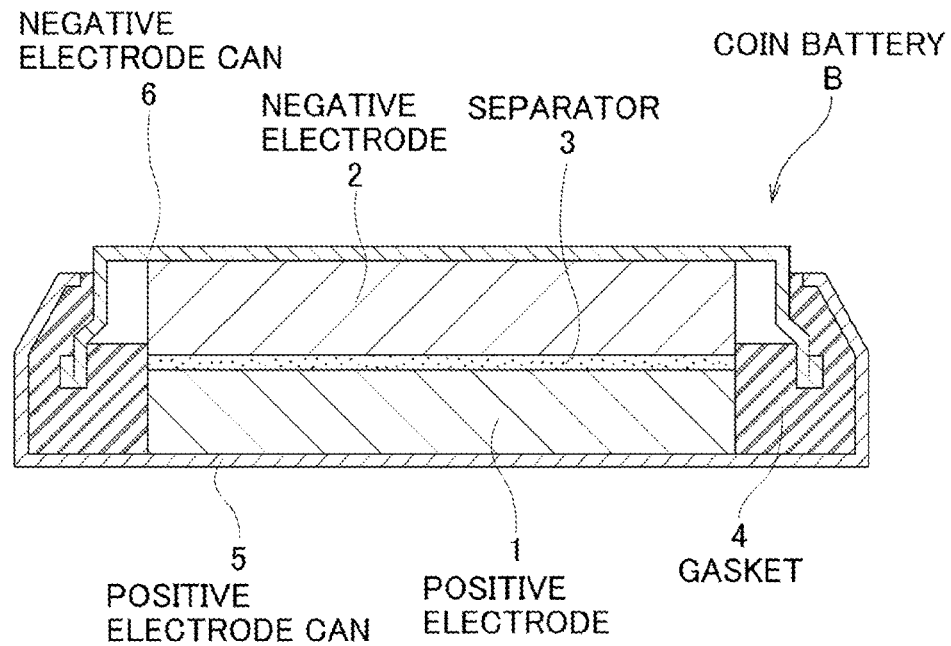
FIG. 1 is a vertical cross-sectional view illustrating a schematic structure of a 2032 type coin battery used for battery evaluation.

Hereinafter, a positive electrode active material for a nonaqueous electrolyte secondary battery, a method for producing the same, and a nonaqueous electrolyte secondary battery of the present invention will be sequentially described in detail.

1. Positive Electrode Active Material for a Nonaqueous Electrolyte Secondary Battery 1.1) Composition The positive electrode active material for a nonaqueous electrolyte secondary battery of the present invention is a positive electrode active material that comprises a lithium nickel composite oxide represented by the following composition formula (1):

Composition formula: $Li_bNi_{1-a}M1_aO_2$ (1), where M1 represents at least one kind of element selected from transition metal elements other than Ni, group 2 elements, and group 13 elements, $0.01 \leq a \leq 0.5$, and $0.85 \leq b \leq 1.05$, and has a specific surface area of 0.5 m²/g to 2.05 m²/g, and the carbon content (TC) of the lithium nickel composite oxide powder is adjusted to 0.08% by mass or less with respect to the total mass.

In this positive electrode active material, nickel (Ni) is an element that contributes to increasing the electric potential and capacity of the secondary battery, and the value of (1−a) that indicates the nickel content is no less than 0.5 and no more than 0.99, and preferably is no less than 0.8 and no more than 0.97, and more preferably is no less than 0.9 and no more than 0.95. When the value of (1−a) that indicates the nickel content is less than 0.5, the battery capacity of a secondary battery using this positive electrode active material may not be improved. On the other hand, when the value of (1−a) exceeds 0.99, the contents of other metal elements decrease, and the effects thereof may not be obtained.

In addition, the value of b that indicates the lithium (Li) content is no less than 0.85 and no more than 1.05 or less, and preferably no less than 0.9 and no more than 1.02, and more preferably no less than 0.95 and no more than 1.00. By setting the value of b within the range described above, the output characteristics and battery capacity of a secondary battery using this positive electrode active material as the positive electrode material may be improved. However, when the value of b is less than 0.85, the positive electrode resistance of the secondary battery increases, so the output characteristics may not be improved. On the other hand, when the value of b exceeds 1.05, not only is the initial discharge capacity lowered, but also the positive electrode resistance is increased.

The lithium nickel composite oxide is not particularly limited as long as it is a compound represented by the above composition formula (1); however, even among lithium nickel composite oxides, a lithium nickel composite oxide that is represented by the following composition formula (2):

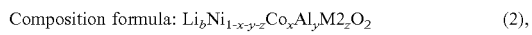

Composition formula: $Li_bNi_{1-x-y-z}Co_xAl_yM2_zO_2$ (2), where M2 represents at least one kind of element selected from the group consisting of Mn, Ti, Ca, and Mg, $0.85 \leq b \leq 1.05$, $0.05 \leq x \leq 0.30$, $0.01 \leq y \leq 0.1$, and $0 \leq z \leq 0.05$, is preferred.

Hereinafter, the additive elements constituting the lithium nickel composite oxide represented by the composition formula (2) and the addition amount thereof will be described.

a) Co

Co is an additive element that contributes to the improvement of cycle characteristics; however, when the value of x indicating the added amount is less than 0.05, sufficient cycle characteristics may not be obtained, and the capacity maintenance rate will also decrease. In addition, when the value of x exceeds 0.3, the initial discharge capacity is greatly reduced. In order to secure a large charge and discharge capacity that is characteristic of lithium nickel composite oxide, and to obtain sufficient cycle characteristics, the value of x is preferably set to 0.10 to 0.20.

b) Al

Al is an additive element effective in improving safety, and when the value of y that indicates the added amount is less than 0.01, the added amount is too small and the effect becomes too low. Moreover, when the value of y exceeds 0.1, the safety is improved according to the amount added, however, the charge/discharge capacity decreases, which is not preferable. In order to suppress a decrease in charge/discharge capacity, the value of y is preferably 0.01 to 0.05.

c) M2

The additive element M2 is at least one element selected from Mn, Ti, Ca, or Mg, and may be added to improve cycle characteristics and safety. When the value z that indicates the added amount exceeds 0.05, the degree of stabilization of the crystal structure is further improved, however, the initial discharge capacity is greatly reduced, which is not preferable. In order to improve the degree of stabilization of the crystal structure and prevent a reduction in the initial discharge capacity, the value of z is preferably set to 0.01 to 0.05.

1.2) Carbon Content of the Positive Electrode Active Material

When lithium carbonate is present on the surface of the positive electrode active material that comprises lithium nickel composite oxide, in a secondary battery using such a positive electrode active material as a positive electrode material, while being used and maintained in a high temperature state, gas is generated due to the decomposition of lithium carbonate, so the secondary battery expands, and the safety thereof is lowered. Therefore, it is necessary to reduce the amount of lithium carbonate present on the surface of the positive electrode active material as much as possible.

The inventors of the present invention obtained knowledge that there is a correlation between the carbon content (TC) of the lithium nickel composite oxide and the lithium carbonate present on the surface, and that it is possible to suppress gas generation in the secondary battery by controlling the carbon content (TC) to be below a specific value. In particular, it was confirmed that the effect of suppressing this gas generation is enhanced by performing a suitable water washing process on the lithium nickel composite oxide.

However, in some cases it may be insufficient to merely reduce the amount of lithium carbonate present on the surface of the positive electrode active material at the time of production. In other words, in the lithium nickel composite oxide constituting the positive electrode active material of the present invention, generally, in addition to lithium carbonate, a surplus of lithium compounds such as lithium sulfate, lithium hydroxide or the like remain on the surface or crystal grain boundaries. After the positive electrode active material is produced and before being incorporated into the secondary battery, lithium hydroxide present on the surface of the positive electrode active material may react with carbon dioxide gas in the process atmosphere to become lithium carbonate, and lithium carbonate on the surface of the positive electrode active material may increase more than that immediately after production. Therefore, in addition to suppressing the amount of lithium carbonate present on the surface of the positive electrode active material, by further suppressing the amount of lithium hydroxide, it becomes possible to more effectively suppress gas generation at high temperature.

The present invention regulates the amount of the lithium compound present on the surface, including lithium compound that is carbonated between the time of producing the positive electrode active material and the time of incorporation into the secondary battery, according to the carbon content (TC) of the lithium nickel composite oxide. Note that the carbon content (TC) of the lithium nickel composite oxide is measured by a combustion-infrared absorption method, preferably a high-frequency combustion-infrared absorption method.

In the present invention, by controlling the carbon content (TC) of the lithium nickel composite oxide to be 0.08% by mass or less with respect to the total mass of the lithium nickel composite oxide, it is possible to suppress gas generation at high temperature. When the carbon content (TC) exceeds 0.08% by mass, the amount of lithium carbonate included in the positive electrode material constituting the secondary battery increases, and the amount of decomposition gas generated when exposed to a high temperature state becomes large, and the secondary battery expands. Note that it is preferable that the carbon content (TC) be 0.06% by mass or less, and more preferable 0.04% by mass or less. On the other hand, the lower limit of the carbon content (TC) is not particularly limited, however, is preferably 0.01% by mass or more. When the carbon content (TC) is less than 0.01% by mass, there is a possibility that the lithium nickel composite oxide that has undergone a water washing process may be in an excessively washed state. In an excessively washed lithium nickel composite oxide, lithium in crystals in the vicinity of the surface is desorbed, and a layer of NiO from which Li is removed or NiOOH in which Li and H are substituted is formed on the particle surface, however, all of these layers have high electric resistance, so there is a possibility that a problem will occur in which the resistance of the particle surface in the positive electrode active material increases.

1.3) Amount of Lithium in the Lithium Compound Present on the Surface of the Positive Electrode Active Material In the present invention, the amount of lithium in the lithium compound present on the surface of the positive electrode active material (surface lithium amount) means the mass ratio of lithium in the lithium compound present on the particle surface of the lithium nickel composite oxide to the entire lithium nickel composite oxide. By setting the amount of lithium to be 0.10% by mass or less, gas generation at high temperature may be more effectively suppressed. In addition to lithium hydroxide and lithium carbonate, other lithium compounds are also present on the surface of the lithium nickel composite oxide particles constituting the positive electrode active material; however, when produced under normal conditions, the majority are lithium hydroxide and lithium carbonate, and by controlling the amount of lithium present on the surface of lithium nickel composite oxide particles, it becomes possible to more effectively suppress gas generation at high temperature.

When the amount of lithium present on the surface of the lithium nickel composite oxide particles exceeds 0.10% by mass, the amount of lithium carbonate included in the secondary battery when used as a secondary battery increases, and exposing the lithium nickel composite oxide particles to a high temperature state, may, in some cases, cause gas generation and swelling of the secondary battery. Note that, preferably the lithium amount is 0.07% by mass or less, and more preferably is 0.05% by mass or less.

On the other hand, the lower limit of the amount of lithium present on the particle surface of the lithium nickel composite oxide is not particularly limited, however, is preferably 0.01% by mass or more. When this amount of lithium is less than 0.01% by mass, there is a possibility that the lithium nickel composite oxide is in an excessively washed state. In other words, in this state, the lithium nickel composite oxide powder is excessively washed, and there is almost no lithium compound present on the surface. However, even in a state in which there is almost no lithium compound present on the surface, in some cases a small amount of lithium may be eluted from the inside of the lithium nickel composite oxide, and less than 0.01% by mass of lithium will be detected as the amount of lithium. In a case where excessive washing is performed, not only may there be a problem of increased resistance on the surface of lithium nickel composite oxide particles, but there is also a possibility that Li present in the lithium nickel composite oxide will be reduced and the capacity of the secondary battery will be lowered.

Note that the amount of lithium in the lithium compound present on the powder surface of the lithium nickel composite oxide (surface lithium amount) may be determined as follows. In other words, after adding a lithium soluble solvent to lithium-nickel composite oxide to make a slurry, quantification is performed by neutralization titration using the pH of the slurry as an index, and from the results of quantitative analysis by neutralization titration, the mass ratio of lithium present on the powder surface of the lithium nickel composite oxide with respect to the entire lithium nickel composite oxide is determined. The reason for using neutralization titration for the measurement of the surface lithium amount is that the lithium amount of only lithium in the lithium compound present on the surface of the lithium nickel composite oxide powder can be accurately measured. However, it is also possible to use other known alternative methods capable of performing quantitative analysis of the surface lithium amount.

In neutralization titration, the alkali content in the slurry is quantified, however, this alkali content is considered to be lithium in a lithium compound such as lithium hydroxide, lithium carbonate, lithium hydrogen carbonate or the like on the surface of the powder of the lithium nickel composite oxide. Therefore, the alkali content determined by the neutralization titration is regarded as lithium in the lithium compound present on the powder surface, and the mass ratio of the lithium with respect to the lithium nickel composite oxide can be determined as the amount of lithium.

In order to prevent impurities from entering the slurry, the solvent used for the neutralization titration is preferably pure water, for example, using water having an electric conductivity of 1 µS/cm or less is preferable, and using water having an electric conductivity of 0.1 µS/cm is more preferable. The slurry concentration is preferably set such that the lithium compound on the powder surface of the lithium nickel composite oxide powder is sufficiently dissolved in the solvent, and the operation in titration is easy, and thus such that the ratio of the solvent with respect to the lithium nickel composite oxide powder is preferably in the range of 5 to 100 in terms of mass ratio.

Also, the acid may be any acid that is normally used for titration, and preferably at least one is selected from the group consisting of hydrochloric acid, sulfuric acid, nitric acid, and organic acid.

If the ratio of the solvent is less than 5, the lithium compound on the particle surface of the lithium nickel composite oxide particles may not be sufficiently dissolved, and there is a possibility that the total amount of lithium present on the particle surface may not be measured properly by neutralization titration. On the other hand, when the ratio of the solvent exceeds 100, the pH of the slurry at the time when all of the lithium compound on the particle surface is dissolved is too low, and lithium and protons in the crystals present in the vicinity of the surface cause an exchange reaction, resulting in even the lithium in the crystals being eluted in the solvent. In this case, the amount of lithium obtained by neutralization titration includes the amount of lithium eluted from the crystals near the surface in addition to the amount of lithium present on the surface, so the amount of lithium present on the surface may not be determined accurately.

The titration conditions may be those normally used for neutralization titration for an alkaline solution, and the equivalent point can be determined from the inflection point of pH. For example, the equivalent point of lithium hydroxide is around pH 8, and the equivalent point of lithium carbonate is around pH 4.

1.4) Characteristics of Positive Electrode Active Material

Usually, surplus impurities such as lithium carbonate, lithium sulfate, lithium hydroxide and the like remain on the surface or crystal grain boundary of the lithium nickel composite oxide constituting the positive electrode active material for a nonaqueous electrolyte secondary battery. Therefore, in a nonaqueous electrolyte secondary battery that uses such a positive electrode active material, the internal resistance of the secondary battery is large, and the performance of the positive electrode active material, which is the positive electrode material, cannot be sufficiently exhibited for battery capacity such as charge and discharge efficiency and cycle performance. On the other hand, in the positive electrode active material of the present invention, as will be described later, impurities on the surface and grain boundaries are appropriately removed by applying an appropriate water washing process or the like, so in a case where used in a secondary battery as a positive electrode material, the internal resistance is reduced, and it becomes possible to sufficiently exhibit the battery performance inherent to the positive electrode active material.

The specific surface area of the positive electrode active material of the present invention is in the range of 0.5 m²/g to 2.05 m²/g, and preferably is in the range of 0.7 m²/g to 1.7 m²/g, and even more preferably is in the range of 0.8 m²/g to 1.5 m²/g. When the specific surface area of the lithium nickel composite oxide constituting the positive electrode active material exceeds 2.05 m²/g, the calorific value due to the reaction with the electrolyte in the secondary battery at the time of abnormality suddenly increases, which in some cases brings about a reduction in the thermal stability. On the other hand, when the specific surface area is less than 0.5 m²/g, such heat generation can be suppressed, however, the area contributing to the reaction is small, so the charge and discharge capacity and output characteristics of the secondary battery may be reduced. The specific surface area of the positive electrode active material of the present invention may be regulated by a step of preparing the fired powder of the lithium nickel composite oxide according to the present invention, which will be described later, and by a step of washing and drying the firing powder according to the present invention.

In addition, the moisture content of the lithium nickel composite oxide powder constituting the positive electrode active material is preferably 0.2% by mass or less, and preferably 0.1% by mass or less, and even more preferably 0.05% by mass or less. In other words, when the moisture content of the powder exceeds 0.2% by mass, the moisture in the powder absorbs gas components including carbon and sulfur in the atmosphere; for example, absorbs carbon dioxide, nitrogen oxides or the like, and this is because these lithium compounds are generated on the surface and cause gas generation at high temperatures when used as a secondary battery. Note that measurement by the Karl Fischer method is suitable as a method for measuring the moisture content.

Furthermore, the positive electrode active material of the present invention is preferably a lithium nickel composite oxide single phase having a hexagonal layered structure. When any other heterogeneous phase exists, the battery characteristics deteriorate.

The positive electrode active material of the present invention is a positive electrode active material having excellent characteristics as a positive electrode material for a nonaqueous electrolyte secondary battery, where in a case of being used as a battery, together with obtaining a high capacity of 175 mAh/g or more, and more preferably 180 mAh/g or more, the reaction resistance is low, the output is high, the occurrence of gas generation at high temperature is suppressed, and safety is also high.

2. Method for Producing Positive Electrode Active Material for a Nonaqueous Electrolyte Secondary Battery The method for producing a positive electrode active material of the present invention includes the following step (i) and step (ii).

In other words, step (i) is a step of preparing a fired powder of the nickel composite oxide by mixing a nickel compound selected from among nickel hydroxide, nickel oxyhydroxide, and nickel oxide, and having nickel as a main component and at least one kind of element selected from transition metal elements other than nickel, group 2 elements, and group 13 elements as a subcomponent, with a lithium compound, and then firing a mixture thereof in an oxygen atmosphere under firing conditions where the maximum temperature is in a range of 650° C. to 850° C., the lithium nickel composite oxide being represented by the composition formula (3):

Composition formula (3): $Li_bNi_{1-a}M1_aO_2$ (3), where M1 represents at least one kind of element selected from transition metal elements other than Ni, group 2 elements, and group 13 elements, 0.01≤a≤0.5, and 0.95≤b≤1.13.

In addition, step (ii) is a step of preparing a powder of the lithium nickel composite oxide by performing a water washing process of the fired powder with spraying the fired powder with water in a temperature range of 10° C. to 40° C. until the electric conductivity (conductivity) of the filtrate is in a range of 30 S/cm to 60 mS/cm, then performing filtration and drying thereof until the moisture content of the adhered water after washing is 10% by mass or less.

Hereinafter, each step will be described in detail.

(1) Step (i): Firing Step

The firing step of step (i) is a step of preparing a fired powder of the lithium nickel composite oxide represented by the composition formula (3) by mixing a nickel compound selected from among nickel hydroxide, nickel oxyhydroxide, and nickel oxide, and having nickel as a main component and at least one kind of element selected from transition metal elements other than nickel, group 2 elements, and group 13 elements as a subcomponent, with a lithium compound, and then firing a mixture thereof in an oxygen atmosphere under firing conditions where the maximum temperature is in the range of 650° C. to 850° C., and preferably in the range of 700° C. to 800° C., and more preferably in the range of 755° C. to 780° C.

The nickel compound used in this firing step is selected from among nickel hydroxide, nickel oxyhydroxide, and nickel oxide, these having nickel as a main component and at least one kind of element selected from transition metal elements other than nickel, group 2 elements, and group 13 elements as a subcomponent.

In order to obtain the positive electrode active material described above, lithium nickel composite oxides obtained by various methods may be used, however, among these, preferably the nickel compound is obtained by a method in which a metal element other than lithium is dissolved or dispersed by crystallization, and a lithium compound are mixed, and then fired.

In other words, in general, typical methods for producing a lithium nickel composite oxide include a method where a nickel compound in which a metal element other than lithium is dissolved or dispersed by a crystallization method, and a lithium compound are mixed as raw materials and fired; a method of performing a spray pyrolysis process using a mixture of all aqueous solutions that include the desired metal elements; a method in which all desired metal element compounds are pulverized and mixed by mechanical pulverization, such as a ball mill, and then fired; and the like.

However, of these methods, in methods other than those producing the nickel raw material by a crystallization method, the specific surface area of the obtained lithium nickel composite oxide is very large, so a problem occurs in thermal stability, and therefore they are not efficient. In addition, by using a crystallization method, nickel hydroxide or nickel oxyhydroxide, which are nickel compounds that form spherical particles having a suitable high bulk density as the positive electrode active material, can be produced. Therefore, including nickel oxide obtained by roasting nickel hydroxide or nickel oxyhydroxide, the method can be said to be advantageous for its filling properties, so the crystallization method is most suitable for the production of lithium nickel composite oxide.

The nickel hydroxide used in this firing step is not particularly limited, and nickel hydroxides obtained by the crystallization method under various conditions may be used. Under these conditions, a nickel hydroxide is preferably prepared, for example, by dripping an aqueous solution that includes a nickel compound as a main component and a metal compound that includes at least one kind of element selected from transition metal elements other than nickel, group 2 elements, and group 13 elements as a sub component, and an solution containing ammonium ion donor into a reaction vessel heated to a temperature preferably in the range of 40° C. to 60° C., and when doing this, appropriately dripping as necessary an aqueous solution of an alkali metal hydroxide capable of being maintained so as to make the reaction solution alkaline, preferably in a pH range of 10 to 14. The nickel hydroxide produced by this method is a powder having a high bulk density, so is suitable as a raw material for a lithium nickel composite oxide used for a positive electrode active material for a nonaqueous electrolyte secondary battery.

When the temperature exceeds 60° C. or the pH exceeds 14, the priority of nucleation in the liquid increases, and crystal growth does not proceed, so only a fine powder is obtained. On the other hand, when the temperature is less than 40° C. or the pH is less than 10, there is little generation of nuclei in the solution, and crystal growth of the particles takes priority, so there is a problem in that very large particles are generated that can cause unevenness when making an electrode, or the remaining amount of metal ions in the reaction solution is high and the reaction efficiency becomes very poor.

The nickel oxyhydroxide used in this firing step is not particularly limited, and may be prepared by adding a step of further adding an oxidizing agent such as sodium hypochlorite, hydrogen peroxide or the like to the nickel hydroxide adjustment step. The nickel hydroxide produced by this method is a powder having a high bulk density, so is suitable as a raw material for a lithium nickel composite oxide used as a positive electrode active material for a nonaqueous electrolyte secondary battery.

In addition, the nickel oxide used in this firing step is not particularly limited, and may be obtained by roasting the nickel hydroxide or the nickel oxyhydroxide. The conditions for roasting the nickel hydroxide or nickel oxyhydroxide are not particularly limited, however, roasting is preferably performed in the range of 500° C. to 1100° C., and more preferably in the range of 600° C. to 1000° C., and even more preferably in the range of 650° C. to 745° C. in an air atmosphere.

When the roasting temperature is less than 500° C., it is difficult to stabilize the quality of the lithium nickel composite oxide obtained by using this, and the composition tends to be non-uniform during synthesis. On the other hand, when the roasting temperature exceeds 1100° C., the primary particles constituting the particles undergo rapid particle growth, and in the subsequent preparation of the lithium nickel composite oxide, the reaction surface area on the nickel compound side becomes too small, so there is a problem in that there is no reaction with lithium, and specific gravity separation occurs between the nickel compound having a large specific gravity in the lower layer and the lithium compound in the molten state in the upper layer.

In the production method of the present invention, a fired powder of lithium nickel composite oxide represented by composition formula (3) is prepared by mixing at least one nickel compound selected from the nickel hydroxide, the nickel oxyhydroxide, and the nickel oxide with a lithium compound, after which firing of a mixture thereof is performed in firing conditions of an oxygen atmosphere and a maximum temperature in the range of 650° C. to 850° C., preferably in the range of 700° C. to 800° C., more preferably in the range of 755° C. to 780° C.

For preparing the mixture, a dry blender such as a V blender or the like, a mixing granulator, or the like may be used, and for performing firing, a gas atmosphere such as an oxygen atmosphere, a dehumidified and decarbonated dry air atmosphere, or the like adjusted to a gas atmosphere having an oxygen concentration of 20% by mass or higher is prepared, and a firing furnace such as an electric furnace, a kiln, a tubular furnace, a pusher furnace or the may be used.

The lithium compound is not particularly limited, and at least one selected from a group that includes a hydroxide, an oxyhydroxide, an oxide, a carbonate, a nitrate, and a halide of lithium may be used.

In this firing step, the mixing ratio of the nickel compound and the lithium compound is not particularly limited, however, for example, it is preferable to adjust the mixing ratio so that the molar ratio of the amount of lithium in the lithium compound with respect to the total amount of nickel, transition metal elements other than nickel, group 2 elements, and group 13 elements in the nickel oxide is within the range 0.95 to 1.13.

In other words, when the molar ratio is less than 0.95, the molar ratio of the obtained fired powder is also less than 0.95, the crystallinity is very poor, and the molar ratio between lithium after washing with water and metal other than lithium becomes less than 0.85, which causes a large decrease in battery capacity during the charge and discharge cycle. On the other hand, when the molar ratio exceeds 1.13, the molar ratio of the obtained fired powder also exceeds 1.13, and a large amount of excess lithium compound is present on the surface, which is difficult to remove by washing with water. Therefore, when a lithium nickel composite oxide in which this kind of excess lithium compound is present is used as the positive electrode active material, not only is a large amount of gas generated during charging of the secondary battery, but also a powder having a high pH is obtained, which causes a problem in that the slurry reacts with a material such as an organic solvent or the like used at the time of making an electrode, causing the slurry to gel. Moreover, the molar ratio after washing exceeds 1.05, so the internal resistance of the positive electrode is increased in the secondary battery using the positive electrode active material that is finally obtained.

In addition, the firing temperature is controlled so that the maximum temperature is in the range of 650° C. to 850° C., and preferably in the range of 700° C. to 800° C., and more preferably in the range of 755° C. to 780° C. In other words, by performing heat treatment at a temperature such that the firing temperature exceeds 500° C., nickel lithium oxide is generated, however, when the firing temperature is less than 650° C., the crystals are undeveloped and structurally unstable, and the structure is easily destroyed by phase transition or the like due to charge and discharge. On the other hand, when the firing temperature exceeds 850° C., the layered structure is broken down and lithium ion insertion and extraction become difficult, and furthermore, nickel oxide or the like is generated by decomposition. Furthermore, in order to remove the lithium compound crystal water, and the like, and also cause a uniform reaction in the temperature range where crystal growth proceeds, it is particularly preferable to perform firing in two stages: pre-firing at a temperature of 400° C. to 600° C. for 1 hour or longer, and then firing at 650° C. to 850° C. for 3 hours or longer.

(2) Step (ii): Washing and Drying Step

Step (ii) includes a water washing step for forming a slurry of the fired powder and filtering the fired powder slurry, and a step of drying the filtered powder.

In the present invention, the water washing process of the fired powder is basically a step of mixing the fired powder with water in a temperature range of 10° C. to 40° C., and preferably 15° C. to 30° C. to form a fired powder slurry, and then filtering the fired powder slurry.

In particular, the feature of the present invention is that, in this water washing process, water is continuously sprayed in a temperature range of 10° C. to 40° C., and preferably in a range of 15° C. to 30° C. while measuring the electrical conductivity (conductivity) of the filtrate in real time until the conductivity of the filtrate is in the range of 30 mS/cm to 60 mS/cm.

In this water washing process, by continuously performing a water spraying process until the filtrate has a conductivity of 30 mS/cm to 60 mS/cm, it becomes possible to more uniformly remove lithium present on the surface of the lithium nickel composite oxide. The end point of the electrical conductivity of the filtrate is preferably in the range of 35 mS/cm to 55 mS/cm, and more preferably in the range of 40 mS/cm to 50 mS/cm.

Moreover, together with performing such a water washing process, after filtration (solid-liquid separation of the slurry), by controlling the water content of the adhering water finally remaining on the particle surface to be 10% by mass or less with respect to the lithium nickel composite oxide powder, and preferably within the range of 1% by mass to 8% by mass, the amount of lithium present on the powder surface of the finally obtained lithium nickel composite oxide can be controlled to be 0.10% by mass or less, and the moisture content can be controlled to be 0.2% by mass or less, and the gas generation when maintained at high temperature can be suppressed. In addition, together with obtaining a positive electrode active material capable of achieving both high capacity and high output, high safety may also be achieved. When there is too much adhering water remaining on the particle surface after the water washing process, lithium that is dissolved in the adhering water will re-precipitate, and the lithium present on the surface of the lithium nickel composite oxide powder will carbonate during drying, increasing the carbon content. Therefore, the filtering conditions during filtration are set so that the solid and liquid are finally and sufficiently separated, and so that the moisture content of the adhering water after filtration is 10% by mass or less, and preferably within the range of 1% by mass to 8% by mass with respect to the lithium nickel composite oxide powder. Note that, the moisture content of the adhering water after filtration can be measured using a dry weight method.

In the water washing process, in a case where the slurry temperature of the fired powder slurry and the temperature of the sprayed water (water washing temperature) are less than 10° C., or in a case where the filtration process of the fired powder slurry including the water spraying process is not sufficient and the end point conductivity of the filtrate exceeds 60 mS/cm, washing is insufficient, so a large amount of impurities adhering to the surface of the fired powder remain without being removed. These impurities include lithium carbonate and lithium hydroxide, and the carbon content in the lithium nickel composite oxide powder exceeds 0.08% by mass, and gas is easily generated during high-temperature storage. Moreover, the resistance of the surface increases due to the remaining impurities, so the resistance value when used as the positive electrode of the battery increases. Furthermore, the specific surface area becomes too small. On the other hand, when the moisture content of the adhering water after the water washing process exceeds 10% by mass, a large amount of lithium included in the adhered water remains on the surface of the positive electrode active material powder after drying. Such lithium becomes lithium carbonate and lithium hydroxide due to carbonation and moisture absorption in a post-filtration step, and as described above, this causes gas generation when high temperature is maintained, and causes an increase in resistance on the surface of the positive electrode active material.

On the other hand, when the washing temperature exceeds 40° C., the amount of lithium eluted from the fired powder increases, the concentration of lithium in the liquid such as water or the like used for washing increases, the amount of lithium that re-adheres to the powder surface as lithium hydroxide increases, the lithium hydroxide in the atmosphere after washing is carbonated, and the carbon content exceeds 0.08% by mass. Moreover, excessive washing occurs and the specific surface area after the water washing process becomes excessively large, so, as a result, the amount of heat generated by the reaction with the electrolytic solution increases, resulting in a decrease in thermal stability. In addition, NiO from which Li is removed or NiOOH in which Li and H are substituted is generated on the surface layer, and both have high electric resistance, so, together with an increase in the resistance of the particle surface, Li in the lithium nickel composite oxide decreases and the capacity decreases.

Moreover, in a case where the water washing process on the fired powder slurry until the end point of the electrical conductivity of the filtrate becomes less than 30 mS/cm, a similar problem occurs due to excess washing.

The electrical conductivity of the filtrate due to the water washing process is affected by the water washing temperature (slurry temperature of the fired powder slurry and the temperature of the sprayed water) and the lithium content of the fired powder, particularly the excess amount of lithium present on the particle surface, however, the electrical conductivity is also affected by the slurry concentration of the fired powder slurry. In other words, when the slurry concentration of the fired powder slurry is lowered, the electrical conductivity of the filtrate in the filtration process is lowered, and when the slurry concentration is increased, the electrical conductivity of the filtrate in the filtration process is increased. However, when the lithium content and production conditions of the fired powder are kept constant, similar filtrate conductivity at the same slurry temperature and slurry concentration is exhibited, so, for the fired powder slurry, by performing preliminary tests to determine slurry and water spray conditions for optimal filtrate conductivity, it becomes possible to appropriately control the conductivity of the filtrate in the washing step, including the water spraying process, by filtration of the fired powder slurry, and to appropriately perform the water washing process up to the end point of the conductivity of the filtrate.

More specifically, as the slurry concentration of the fired powder slurry during the water washing process, the amount (g) of the fired powder with respect to 1 L of water included in the slurry is preferably 500 g/L to 3000 g/L, and more preferably is within the range of 800 g/L to 3000 g/L, and even more preferably is within the range of 1500 g/L to 2500 g/L. In other words, the slurry concentration increases as the amount of powder increases, and when the concentration exceeds 3000 g/L, the viscosity also becomes very high, so not only does stirring become difficult, but the alkali in the liquid is high, so the dissolution rate of the deposits becomes slow due to equilibrium, and separation from the powder becomes difficult even though peeling may occur. In addition, since washing with water is not sufficient, the carbon content (TC) and the amount of lithium on the surface increase. On the other hand, when the slurry concentration is less than 1000 g/L, and in particular, less than 500 g/L, the elution amount of lithium becomes excessive in the subsequent water spraying process, the conductivity of the final filtrate becomes less than 30 mS/cm, and the amount of lithium is reduced, however, lithium desorption from the crystal lattice of the positive electrode active material also begins to occur, and not only is the crystal easily broken, but there is also a possibility that a high pH aqueous solution may absorb carbon dioxide gas in the atmosphere and re-precipitate lithium carbonate. Incidentally, in consideration of productivity from an industrial point of view, and from the aspect equipment performance and workability, the slurry concentration is preferably within the range of 500 g/L to 2000 g/L. For example, in JP2004-171961A, evaluation of a positive electrode active material is performed using a diluted slurry concentration of 40 g/L, however, at such a slurry concentration, the conductivity of the filtrate after the water washing process becomes too low.

Note that the electrical conductivity of the filtrate in the water washing process preferably can be determined in real time by measuring with an electric conductivity meter the liquid part obtained by solid-liquid separation of a part of the fired powder slurry, or the filtrate produced by filtration of the fired powder slurry in the water washing process including the water spraying process.

The washing time including the water spraying process is not particularly limited, however, it is necessary that the time be sufficient for the carbon content of the lithium nickel composite oxide to become 0.08% by mass or less, and it is important to set the time appropriately depending on the washing temperature and the conductivity of the filtrate, and is usually in the range of about 20 minutes to 2 hours.

Note that the water used in the water washing process (slurrying process and water spraying process) of the fired powder is not particularly limited, and water having an electrical conductivity of less than 10 μS/cm is preferable, and 1 μS/cm or less is even more preferable. In other words, when the electrical conductivity is less than 10 μS/cm, it is possible to prevent a decrease in battery performance due to adhesion of impurities to the positive electrode active material.

In the present invention, after performing the water washing process by filtration of the fired powder slurry including the slurrying process of the fired powder, and the water spraying process, the powder after filtration is provided to a drying process.

The drying method in this drying step is not particularly limited, and a known method can be used, however, from the aspect of suppressing an increase in the carbon content of the lithium nickel composite oxide and the absorption of nitrogen oxides and the like, drying is preferably performed in a gas atmosphere that does not include a compound including carbon and sulfur, or in a vacuum atmosphere. Moreover, the drying temperature is not particularly limited, however, when the powder is exposed to a high temperature in a state of including a large amount of moisture, as the surface moisture evaporates, a resistance layer that inhibits the movement of lithium ions and electrons is formed on the positive electrode active material and the charge and discharge capacity decreases, so at least in the initial stage of drying, the drying temperature is 100° C. or lower, and preferably no lower than 80° C. and no higher than 100° C., and even more preferably lower than 80° C. but no higher than 90° C. When the drying temperature is lower than 80° C., the drying time of the positive electrode active material after washing with water becomes long, and there is a possibility that efficiency may deteriorate, and that the gradient of lithium concentration may increase between the particle surface and the inside of the particle. Note that preferably, after most of the moisture is dried at a drying temperature of 100° C. or lower, by further drying in a temperature range of 100° C. to 700° C., and preferably in a range of 100° C. to 550° C., and even more preferably in a range of 120° C. to 350° C., the drying time can be shortened, and productivity and thermal energy cost may be improved. Note that it is expected that in the vicinity of the surface of the positive electrode active material, the state will be very close to the stoichiometric ratio, or lithium will be slightly desorbed and in a state close to a charged state, so a temperature exceeding 700° C. may trigger the crystal structure of the powder close to the charged state to break down, which may cause a decrease in electrical characteristics. The timing for raising the drying temperature can be, for example, after a sufficient time has elapsed from the start of drying until the moisture content of the lithium nickel composite oxide powder becomes 1% by mass or less.

3. Nonaqueous Electrolyte Secondary Battery

The nonaqueous electrolyte secondary battery of the present invention is a high-capacity and highly safe nonaqueous electrolyte secondary battery in which incorporated is a positive electrode that is made using the positive electrode active material comprising the lithium nickel composite oxide of the present invention, and particularly, that obtained by the production method of the present invention as a positive electrode material.

Note that according to the present invention, the characteristics of the positive electrode active material itself are improved, so the performance of the secondary battery obtained using this positive electrode active material is not influenced by the shape thereof. In other words, the shape of the secondary battery is not limited to being a coin battery, and a cylindrical battery or a rectangular battery obtained by winding a belt-like positive electrode and negative electrode via a separator may be adopted.

(1) Positive Electrode

Next, the positive electrode used for the nonaqueous electrolyte secondary battery of the present invention and the preparation method thereof will be described, however, the present invention is not particularly limited to this. For example, the positive electrode of the nonaqueous electrolyte secondary battery can be produced by supporting a positive electrode mixture including a positive electrode active material and a binder on a strip-shaped positive electrode core material (positive electrode current collector). Note that the positive electrode mixture may further include an additive such as a conductive additive or the like as an optional component. Supporting the positive electrode mixture on the core material is performed by preparing a paste by dispersing the positive electrode mixture in a liquid component, then coating the paste on the core material and drying.

As the binder, either a thermoplastic resin or a thermosetting resin may be used, however, it is preferable to use a thermoplastic resin.

Examples of the thermoplastic resin that may be used include polyethylene, polypropylene, polytetrafluoroethylene (PTFE), polyvinylidene fluoride (PVDF), styrene butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like. These may be used alone or in combination of two or more. Moreover, these may be a crosslinked body by $Na^+$ ions or the like.

As the conductive assistant, any electron conductive material can be used as long as it is chemically stable in a secondary battery. For example, graphite such as natural graphite (such as flake graphite and the like), artificial graphite and the like; carbon black such as acetylene black, ketjen black, channel black, furnace black, lamp black, thermal black and the like; and conductive fiber such as carbon fiber, metal fiber and the like; metal powder such as aluminum and the like; conductive whiskers such as zinc oxide, potassium titanate and the like; conductive metal oxide such as titanium oxide and the like, organic conductive material such as polyphenylene derivatives and the like; carbon fluoride and the like may be used. These may be used alone or in combination of two or more.

The amount of the conductive assistant added to the positive electrode mixture is not particularly limited, and is preferably in the range of 0.5% by mass to 50% by mass with respect to the positive electrode active material included in the positive electrode mixture, and more preferably is within the range of 0.5% by mass to 30% by mass, and even more preferably is within the range of 0.5% by mass to 15% by mass.

As the positive electrode core material (positive electrode current collector), any arbitrary electronic conductor may be used as long as the conductor is chemically stable in a secondary battery. For example, a foil or sheet made of aluminum, stainless steel, nickel, titanium, carbon, conductive resin, or the like may be used; and in particular, it is more preferable to use an aluminum foil or an aluminum alloy foil. Here, a carbon or titanium layer may be applied, or an oxide layer may be formed on the surface of a foil or sheet. Moreover, unevenness may be applied to the surface of the foil or the sheet, or a net, a punching sheet, a lath body, a porous body, a foamed body, a fiber group molded body, and the like may also be used.

The thickness of the positive electrode core material is not particularly limited, and for example, a positive electrode core material having a thickness in the range of 1 μm to 500 μm may be used.

(2) Negative Electrode

Next, components other than the positive electrode used in the nonaqueous electrolyte secondary battery of the present invention will be described. However, the nonaqueous electrolyte secondary battery of the present invention is characterized in that the positive electrode active material of the present invention is used, and other components are not particularly limited.

First, as the negative electrode, an electrode capable of charging and discharging lithium is used; for example, it is possible to use an electrode in which a negative electrode mixture including a negative electrode active material and a binder, and including a conductive assistant and a thickening agent as optional components is supported by a negative electrode core material. Such a negative electrode may be produced in the same manner as the positive electrode.

The negative electrode active material may be any material that is able to electrochemically charge and discharge lithium. For example, graphites, non-graphitizable carbon materials, lithium alloys and the like may be used. The lithium alloy is preferably an alloy including at least one kind of element particularly selected from a group consisting of silicon, tin, aluminum, zinc, and magnesium.

The average particle diameter of the negative electrode active material is not particularly limited, and for example, a negative electrode active material having an average particle diameter in the range of 1 μm to 30 μm may be used.

As the binder, either a thermoplastic resin or a thermosetting resin may be used, however, it is preferable to use a thermoplastic resin. Examples of the thermoplastic resin that may be used include polyethylene, polypropylene, polytetrafluoroethylene (PTFE), polyvinylidene fluoride (PVDF), styrene butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like. These may be used alone or in combination of two or more. Moreover, these may be a crosslinked body by $Na^+$ ions or the like.

As the conductive assistant, any electron conductive material can be used as long as it is chemically stable in a secondary battery. For example, graphite such as natural graphite (such as flake graphite and the like), artificial graphite and the like; carbon black such as acetylene black, ketjen black, channel black, furnace black, lamp black, thermal black and the like; and conductive fiber such as carbon fiber, metal fiber and the like; metal powder such copper, nickel and the like; organic conductive material such as polyphenylene derivatives and the like may be used. These may be used alone or in combination of two or more.

The amount of the conductive assistant added is not particularly limited, and is preferably in the range of 1% by mass to 30% by mass with respect to the negative electrode active material included in the negative electrode mixture, and more preferably is within the range of 1% by mass to 10% by mass.

As the negative electrode core material (negative electrode current collector), any arbitrary electronic conductor may be used as long as the conductor is chemically stable in a secondary battery. For example, a foil or sheet made of stainless steel, nickel, copper, titanium, carbon, conductive resin, or the like may be used, and it is particularly preferable to use a foil or sheet of copper and a copper alloy. A layer of carbon, titanium, nickel or the like may be applied, or an oxide layer may be formed on the surface of the foil or sheet. Moreover, unevenness may be applied to the surface of the foil or the sheet, or a net, a punching sheet, a lath body, a porous body, a foamed body, a fiber group molded body, and the like may also be used.

The thickness of the negative electrode core material is not particularly limited, and for example, a negative electrode core material having a thickness in the range of 1 μm to 500 μm may be used.

(3) Nonaqueous Electrolyte

As the nonaqueous electrolyte constituting the nonaqueous electrolyte secondary battery of the present invention, it is preferable to use a nonaqueous solvent in which a lithium salt is dissolved.

Examples of nonaqueous solvents that may be used include, for example, cyclic carbonates such as ethylene carbonate (EC), propylene carbonate (PC), butylene carbonate (BC), vinylene carbonate (VC) and the like; chain carbonates such as dimethyl carbonate (DMC), diethyl carbonate (DEC), ethyl methyl carbonate (EMC), dipropyl carbonate (DPC) and the like; aliphatic carboxylic acid esters such as methyl formate, methyl acetate, methyl propionate, ethyl propionate and the like; lactones such as γ-butyrolactone, γ-valerolactone and the like; chain ethers such as 1,2-dimethoxyethane (DME), 1,2-diethoxyethane (DEE), ethoxymethoxyethane (EME) and the like; cyclic ethers such as tetrahydrofuran, 2-methyltetrahydrofuran and the like; dimethyl sulfoxide, 1,3-dioxolane, formamide, acetamide, dimethylformamide, dioxolane, acetonitrile, propyl nitrile, nitromethane, ethyl monoglyme, phosphoric acid triester, trimethoxymethane, dioxolane derivative, sulfolane, methylsulfolane, 1,3-dimethyl-2-imidazolidinone, 3-methyl-2-oxazolidinone, propylene carbonate derivative, tetrahydrofuran derivative, ethyl ether, 1,3-propane sultone, anisole, dimethyl sulfoxide, N-methyl-2-pyrrolidone, and the like. These may be used alone, however, using a mixture of two or more is preferable. Among these as well, it is preferable to use a mixed solvent of a cyclic carbonate and a chain carbonate, or a mixed solvent of a cyclic carbonate, a chain carbonate, and an aliphatic carboxylic acid ester.

As the lithium salt, it is possible, for example, to use $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic lithium carboxylate, LiCl, LiBr, LiI, lithium chloroborane, lithium tetraphenylborate, lithium imide salt, and the like. These may be used alone or in combination of two or more. Note that it is preferable to use at least $LiPF_6$.

The lithium salt concentration in the nonaqueous solvent is not particularly limited, however, is preferably in the range of 0.2 mol/L to 2 mol/L, and more preferably in the range of 0.5 mol/L to 1.5 mol/L.

Various additives may be added to the nonaqueous electrolyte for the purpose of improving the charge and discharge characteristics of the battery. As additives, it is possible to use, for example, triethyl phosphite, triethanolamine, cyclic ether, ethylenediamine, n-glyme, pyridine, hexaphosphoric acid triamide, nitrobenzene derivatives, crown ethers, quaternary ammonium salts, ethylene glycol dialkyl ether, and the like.

(4) Separator

A separator is arranged between the positive electrode and the negative electrode. As the separator, it is preferable to use a microporous thin film having a high ion permeability, a specified mechanical strength, and an insulating property. The microporous thin film preferably has a function of closing the pores at a certain temperature or higher, and increasing the resistance. As the material for the microporous thin film, using polyolefin such as polypropylene, polyethylene or the like having excellent organic solvent resistance and hydrophobicity is preferred. Further, a sheet made of glass fiber or the like, a nonwoven fabric, a woven fabric, or the like may also be used.

The pore diameter of the separator may be, for example, in the range of 0.01 μm to 1 μm. The thickness of the separator is usually in the range of 10 μm to 300 μm. The porosity of the separator is usually in the range of 30% to 80%.

Furthermore, a polymer electrolyte made of a nonaqueous electrolyte and a polymer material that holds the nonaqueous electrolyte may be used as a separator that is integrated with the positive electrode or the negative electrode. As this kind of a polymer material, any material may be used as long as the material can hold a nonaqueous electrolytic solution, and in particular, a copolymer of vinylidene fluoride and hexafluoropropylene is preferably used.

EXAMPLES

Hereinafter, the present invention will be described in further detail by way of Examples and Comparative Examples of the present invention, however, the present invention is not limited to these examples.

Note that for the lithium nickel composite oxides obtained in the Examples and Comparative Examples, analysis of the compositions was performed by ICP emission analysis, analysis of the carbon content (TC) was performed by high-frequency combustion-infrared absorption, and measurement of the specific surface area was performed by the nitrogen adsorption BET method.

Moreover, the nickel sulfate hexahydrate, cobalt sulfate heptahydrate, aluminum sulfate, magnesium sulfate heptahydrate, manganese sulfate pentahydrate, lithium hydroxide monohydrate, aqueous ammonia, caustic soda solution, and the like used in the Examples and Comparative Examples of the present invention are all reagents obtained from Wako Pure Chemical Industries, Ltd.

Example 1

The positive electrode active material that includes lithium nickel composite oxide was produced by a series of steps including: a step of preparing a nickel composite compound having a specified composition described below; a step of preparing a fired powder having a specified composition; and a step of drying the fired powder obtained after washing with water; and furthermore, a coin battery using this as a positive electrode material was produced and evaluated by impedance.

Note that each raw material was weighed so that the molar ratios of the metal components constituting the lithium nickel composite oxide were Ni:Co:Al:Li=0.82:0.15:0.03:1.02.

(1) Step for Preparing a Nickel Composite Compound

First, an aqueous solution was prepared by mixing nickel sulfate hexahydrate, cobalt sulfate heptahydrate, and aluminum sulfate so as to have a desired ratio. This aqueous solution was dripped simultaneously with aqueous ammonia and caustic soda aqueous solution into a stirred reaction tank equipped with a discharge port with water kept at 50° C. Here, a spherical nickel composite hydroxide powder composed of secondary particles in which primary particles are aggregated was produced by a reaction crystallization method in which the pH was maintained at 11.5 and the retention time was controlled to be 11 hours.

(2) Step of Preparing Fired Powder

Lithium hydroxide monohydrate was added to the obtained nickel composite hydroxide powder so as to have a desired composition, and mixed using a V blender. The obtained mixture was pre-fired at 500° C. for 3 hours in an atmosphere having an oxygen concentration of 30% or more using an electric furnace, and then main firing was performed at 760° C. for 20 hours. After that, cooling was performed in a furnace to room temperature, after which a crushing process was performed to obtain a spherical fired powder composed of secondary particles in which primary particles were aggregated.

(3) Step of Washing and Drying the Fired Powder

Pure water at 20° C. (1.0 μS/cm or less) was added to the obtained fired powder to make a fired powder slurry so that the slurry concentration was 2000 g/L, and this fired powder slurry was filtered. At this time, a water spraying process was performed on the fired powder using pure water at 20° C.

The electrical conductivity of the filtrate was measured in real time using an electrical conductivity meter (CM-21P manufactured by AS ONE Corp), the water spraying process was continued until the electrical conductivity of the filtrate reached 45 mS/cm, and then after confirming that the electrical conductivity of the filtrate was 45 mS/cm, the water spraying process was stopped, and solid-liquid separation by filtration was sufficiently performed.

The moisture content of the adhered water remaining on the particle surface after filtration was 5% by mass. Note that the moisture content of the adhering water may be determined by measuring the mass before drying and the mass after drying after filtration of the nickel composite compound, dividing the difference between the mass before drying and the mass after drying by the mass before drying. The extracted powder was left still for 10 hours using the vacuum dryer heated at 150° C. After that, the composition of the obtained lithium nickel composite oxide powder was measured by ICP emission spectroscopy using an ICP emission light analyzer (ICPE-9800, manufactured by Shimadzu Corporation), the carbon content (TC) was measured by the high-frequency combustion-infrared absorption method using a carbon and sulfur analyzer (CS600, manufactured by LECO Japan Corporation), and the specific surface area was measured by a nitrogen adsorption BET method using an automatic specific surface area measuring device (Tristar II 3020, manufactured by Shimadzu Corporation). In addition, the moisture content of the lithium nickel composite oxide powder was measured by the Karl Fischer method using a moisture vaporizer (VA-200, manufactured by Mitsubishi Chemical Analytic Co., Ltd.) and a Karl Fischer moisture measuring device (CA-200, manufactured by Mitsubishi Chemical Analytic Co., Ltd.). Furthermore, when analyzed by powder X-ray diffraction using Cu-Kα rays, the lithium nickel composite oxide powder was confirmed to be composed of a single phase of lithium nickel composite oxide. The results are given in Table 2.

(4) Battery Production and Evaluation

Using the obtained lithium nickel composite oxide, a secondary battery was produced by the method described below, and the internal resistance was measured by the impedance of the secondary battery. The results are given in Table 2.

[Battery Production Method]

To 90 parts by mass of the positive electrode active material powder, 5 parts by mass of acetylene black and 5 parts by mass of polyvinylidene fluoride were mixed, and n-methylpyrrolidone was then added to make a paste. This paste was applied to a 20 μm thick aluminum foil so that the mass of the positive electrode active material after drying was 0.05 g/cm$^2$, vacuum drying was performed at 120° C., and then the result was punched into a disk shape having a diameter of 1 cm to obtain a positive electrode.

Lithium metal was used as the negative electrode, and an equal mixed solution of ethylene carbonate (EC) and diethyl carbonate (DEC) using 1M of LiClO$_4$ as a supporting salt was used for the electrolyte. Moreover, a separator made of polyethylene was impregnated with the electrolyte, and a 2032 type coin battery was produced in a glove box in an Ar gas atmosphere controlled so that the dew point was −80° C.

FIG. 1 illustrates a schematic structure of a 2032 type coin battery. Here, the coin battery includes a positive electrode (electrode for evaluation) 1 in a positive electrode can 5, a lithium metal negative electrode 3 in a negative electrode can 6, an electrolyte-impregnated separator 2, and a gasket 4.

[Evaluation Method Using Impedance]

Figure 2:
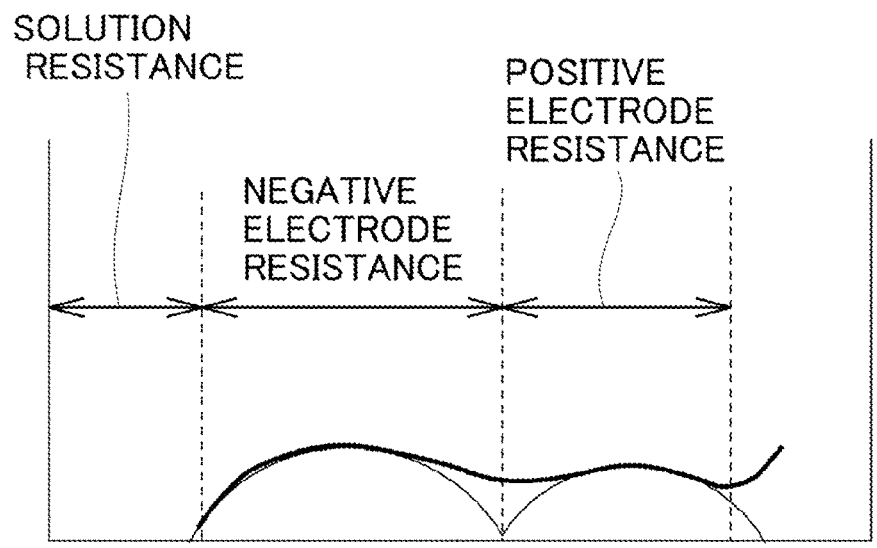
FIG. 2 is a schematic explanatory diagram of an impedance evaluation measurement example and an equivalent circuit used for analysis.
Figure 2:
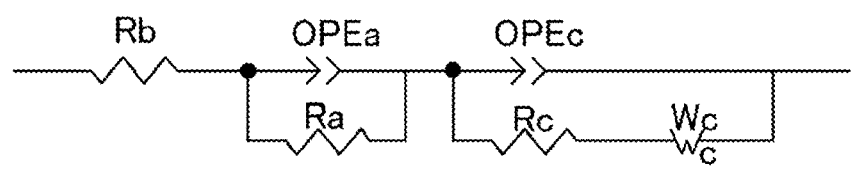

The produced battery was left to stand for about 24 hours, and after the OCV became stable, CCCV charging was performed up to a voltage of 4.0 V at an initial current density of 0.5 mA/cm$^2$ with respect to the positive electrode, after which the charged coin battery was used and impedance measurement was performed by scanning at a frequency of 10 kHz to 0.1 Hz under a voltage condition of a 10 mV. The impedance device used at this time was an impedance analyzer 1255B manufactured by Solartron (Ametek, Inc.). Note that the results are given in Table 2, however, the internal resistance value Rct in Table 2 was calculated by obtaining a Nyquist plot as illustrated in FIG. 2 that is expressed as the sum of the characteristic curves illustrating solution resistance, negative electrode resistance and capacity, and positive electrode resistance and capacity, performing a fitting calculating using an equivalent circuit, and then calculating from the second arc; and in each of the Examples, a relative value is given for a case in which Example 1 is set to 100.

[Measurement of the Surface Lithium Amount]

Ultrapure water (0.058 μS/cm or less) was added to 10 g of lithium nickel composite oxide powder to 100 ml and stirred, after which the result was titrated with 1 mol/L hydrochloric acid and measured to a second neutralization point. The alkali content neutralized with hydrochloric acid was regarded as lithium on the powder surface of the lithium nickel composite oxide, and the mass ratio of lithium with respect to the lithium nickel composite oxide was determined from the titration result, and this value was defined as the surface lithium amount. The results are given in Table 2.

[Measurement of Gas Generation at High Temperature]

Measurement of the amount of gas generated was performed by leaving the produced battery in a charged state for 24 hours at a high temperature of 80° C., then cutting a part of the battery outer body, replacing the liquid in paraffin at 23° C., and quantifying the volume of the collected gas. The results are given in Table 2. Note that for the amount of gas generation at high temperature, in each of the Examples, a relative value is given for a case in which Example 1 is set to 5.

Example 2

Except for using a nickeloxy composite hydroxide obtained by further adding sodium hypochlorite to a nickel composite hydroxide and subjecting it to an oxidation process as a nickel composite compound instead of the nickel composite hydroxide in Example 1, a lithium nickel composite oxide was produced by the same steps as in Example 1. Note that it was confirmed by powder X-ray diffraction using Cu-Kα rays that the obtained lithium nickel composite oxide had a single phase of lithium nickel composite oxide.

Example 3

Except for using nickel composite oxide obtained by oxidation roasting of nickel composite hydroxide at 740° C. as a nickel composite compound instead of the nickel composite hydroxide in Example 1, a lithium nickel composite oxide was produced by the same steps as in Example 1. Note that it was confirmed by powder X-ray diffraction using Cu-Kα rays that the obtained lithium nickel composite oxide had a single phase of lithium nickel composite oxide.

Example 4

In the process of washing and drying the fired powder, except for leaving the washed powder to stand in a nitrogen atmosphere at 60° C. for 3 hours and drying, a lithium nickel composite oxide was produced by the same steps as in Example 1. Note that it was confirmed by powder X-ray diffraction using Cu-Kα rays that the obtained lithium nickel composite oxide had a single phase of lithium nickel composite oxide.

Example 5

In the process of washing and drying the fired powder, except for the temperature of the pure water used when making a fired powder slurry and spraying with water being 0° C., and the concentration of the slurry being 3000 g/L, a lithium nickel composite oxide was produced by the same steps as in Example 1. The electrical conductivity of the filtrate at the end of the water spraying process was 60 mS/cm. Note that it was confirmed by powder X-ray diffraction using Cu-Kα rays that the obtained lithium nickel composite oxide had a single phase of lithium nickel composite oxide.

Example 6

In the process of washing and drying the fired powder, except for the slurry concentration being 500 g/L, a lithium nickel composite oxide was produced by the same steps as in Example 1. The electrical conductivity of the filtrate at the end of the water spraying process was 25 mS/cm. Note that it was confirmed by powder X-ray diffraction using Cu-Kα rays that the obtained lithium nickel composite oxide had a single phase of lithium nickel composite oxide.

Example 7

In the process of washing and drying the fired powder, except for the slurry concentration being 800 g/L, a lithium nickel composite oxide was produced by the same steps as in Example 1. The electrical conductivity of the filtrate at the end of the water spraying process was 30 mS/cm. Note that it was confirmed by powder X-ray diffraction using Cu-Kα rays that the obtained lithium nickel composite oxide had a single phase of lithium nickel composite oxide.

Example 8

In the process of washing and drying the fired powder, except for the slurry concentration being 3000 g/L, a lithium nickel composite oxide was produced by the same steps as in Example 1. The electrical conductivity of the filtrate at the end of the water spraying process was 55 mS/cm. Note that it was confirmed by powder X-ray diffraction using Cu-Kα rays that the obtained lithium nickel composite oxide had a single phase of lithium nickel composite oxide.

Example 9

Except for preparing a raw material aqueous solution by weighing raw materials and mixing nickel sulfate hexahydrate, cobalt sulfate heptahydrate, aluminum sulfate, and magnesium sulfate heptahydrate so that the molar ratio after firing became Ni:Co:Al:Mg:Li=0.804:0.148:0.036:0.012:1.02, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 10

Except for preparing a raw material aqueous solution by weighing raw materials and mixing nickel sulfate hexahydrate, cobalt sulfate heptahydrate, aluminum sulfate, and Manganese sulfate pentahydrate so that the molar ratio after firing became Ni:Co:Al:Mn:Li=0.786:0.151:0.035:0.028:1.02, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 11

Except for using lithium oxide instead of the lithium hydroxide monohydrate in Example 1, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 12

Except that the main firing temperature was 700° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 13

Except that the main firing temperature was 800° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 14

In the process of washing and drying the fired powder, except for the temperature of the pure water used when making a fired powder slurry and spraying with water being 15° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 15

In the process of washing and drying the fired powder, except for the temperature of the pure water used when making a fired powder slurry and spraying with water being 30° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 16

In the process of washing and drying the fired powder, except for the temperature of the pure water used when making a fired powder slurry and spraying with water being 35° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 17

In the process of washing and drying the fired powder, except for the temperature of the pure water used when making a fired powder slurry and spraying with water being 12° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 18

In the process of washing and drying the fired powder, except for the temperature of the pure water used when making a fired powder slurry and spraying with water being 38° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 19

In the process of washing and drying the fired powder, except for the temperature of the pure water used when making a fired powder slurry and spraying with water being 10° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 20

In the process of washing and drying the fired powder, except for the temperature of the pure water used when making a fired powder slurry and spraying with water being 40° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 21

In the process of washing and drying the fired powder, except for stopping the water spray at the stage when the conductivity of the filtrate became 60 mS/cm, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 22

In the process of washing and drying the fired powder, except for continuing the water spray until the conductivity of the filtrate became 30 mS/cm, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 23

In the process of washing and drying the fired powder, except for adjusting the moisture content of the adhered water remaining on the particle surface after filtration to be 1% by mass, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Example 24

In the process of washing and drying the fired powder, except for adjusting the moisture content of the adhered water remaining on the particle surface after filtration to be 8% by mass, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 1

In the process of washing and drying the fired powder, except for the temperature of the pure water used when making a fired powder slurry and spraying with water being 0° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 2

In the process of washing and drying the fired powder, except for the temperature of the pure water used when making a fired powder slurry and spraying with water being 50° C., a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 3

In the process of washing and drying the fired powder, except for not performing a water spraying process, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 4

In the process of washing and drying the fired powder, except for stopping the water spray at the stage when the conductivity of the filtrate became 70 mS/cm, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 5

In the process of washing and drying the fired powder, except for continuing the water spray until the conductivity of the filtrate became 20 mS/cm, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 6

In the process of washing and drying the fired powder, except for performing a final filtration so that the water content of the adhered water after filtration is 12% by mass, a lithium nickel composite oxide was produced by the same steps as in Example 3. Note that it was confirmed by powder X-ray diffraction using Cu-Kα rays that the obtained lithium nickel composite oxide had a single phase of lithium nickel composite oxide.

Comparative Example 7

In the process of washing and drying the fired powder, except for the slurry concentration being 3500 g/L, a lithium nickel composite oxide was produced by the same steps as in Example 3. The electrical conductivity of the filtrate at the end of the water spraying process was 65 mS/cm. Note that it was confirmed by powder X-ray diffraction using Cu-Kα rays that the obtained lithium nickel composite oxide had a single phase of lithium nickel composite oxide.

[Table 1]
Example 1
Example 2
Example 3
Example 4
Example 5
Example 6
Example 7
Example 8
Example 9
Example 10
Example 11
Example 12
Example 13
Example 14
Example 15
Example 16
Example 17
Example 18
Example 19
Example 20
Example 21
Example 22
Example 23
Example 24

Comparative Example 1
Comparative Example 2
Comparative Example 3
Comparative Example 4
Comparative Example 5
Comparative Example 6
Comparative Example 7
Raw Material Nickel Composite Compound
   Nickel composite hydroxide
   Nickel composite oxyhydroxide
   Nickel composite oxide
Raw Material Lithium Compound
Firing Temperature (° C.)
Chemical Composition After Firing
Slurry Concentration (g/L)
Washing Temperature (° C.)
Filtrate Conductivity (mS/cm)
Moisture Content After Filtering (wt %)
[Table 2]
Example 1
Example 2
Example 3
Example 4
Example 5
Example 6
Example 7
Example 8
Example 9
Example 10
Example 11
Example 12
Example 13
Example 14
Example 15
Example 16
Example 17
Example 18
Example 19
Example 20
Example 21
Example 22
Example 23
Example 24
Comparative Example 1
Comparative Example 2
Comparative Example 3
Comparative Example 4
Comparative Example 5
Comparative Example 6
Comparative Example 7
Chemical Composition of Produced Lithium Nickel Composite Oxide
Specific Surface Area ($m^2/g$)
Carbon Content (% by mass)
Surface Lithium Amount (% by mass)
Moisture Content (% by mass)
Reaction Resistance Rct (arb. unit)
Initial Discharge Capacity (mAh/g)
High-temperature Gas Generation (arb. unit)
[Evaluation]

From Tables 1 and 2, it is understood that in Examples 1 to 24 that satisfy all the requirements of the present invention, the internal resistance of the obtained positive electrode active material is low, the capacity is high, and the amount of high-temperature gas generation is small.

On the other hand, in Comparative Example 1, the water washing temperature is low, so washing is not sufficient, the carbon content (TC) is large, and the surface lithium amount is also large. Therefore, the internal resistance is greatly increased, and the amount of high-temperature gas generated is also increased. In Comparative Example 2, the washing temperature is high, so the elution of lithium at the time of washing increases, and the initial discharge capacity decreases, and as a result, the carbon content (TC) is large, a high resistance layer is formed on the surface of the positive electrode active material particles, and the internal resistance of the battery is high. In Comparative Example 3, washing is not sufficient, the carbon content (TC) is large, and the surface lithium amount is also large. Therefore, the internal resistance is greatly increased, and the amount of high-temperature gas generated is also increased. In Comparative Example 4, the conductivity of the filtrate is too high and washing is not sufficient, so the carbon content is large and the surface lithium amount is also large. Therefore, together with the internal resistance becoming high, the amount of high-temperature gas generation also increases. In Comparative Example 5, the conductivity of the filtrate is too low and excessively washed, so the elution of lithium during washing with water increases, and the specific surface area is out of the scope of the present invention. Therefore, the initial discharge capacity is reduced and the internal resistance is increased. In Comparative Example 6, the adhered moisture content after filtration is too high, so the moisture content of the positive electrode active material is outside the scope of the present invention, and as a result, the specific surface area is also outside the scope of the present invention. Therefore, the initial discharge capacity is reduced, and a large amount of moisture is mixed in the battery, so the electrolyte is easily decomposed in the charge and discharge state, and the amount of high-temperature gas generated is increased. Furthermore, in Comparative Example 7, the slurry concentration during washing with water was too high, so washing is not sufficient, the carbon content (TC) is large, and the amount of surface lithium is also large. Therefore, the amount of high-temperature gas generation is increased.

INDUSTRIAL APPLICABILITY

As is clear from the description above, the positive electrode active material for a nonaqueous electrolyte secondary battery of the present invention is a positive electrode active material for a nonaqueous electrolyte secondary battery that comprises a lithium nickel composite oxide having a low internal resistance and excellent thermal stability. By using the positive electrode active material of the present invention as the positive electrode material, a nonaqueous electrolyte secondary battery with high capacity and highly safe can be obtained. The nonaqueous electrolyte secondary battery using the positive electrode active material of the present invention is particularly suitable as a chargeable and dischargeable secondary battery used in the field of small electronic equipment, and therefore has very large industrial applicability.

REFERENCE SIGNS LIST

1 Positive electrode (electrode for evaluation)
2 Separator (electrolyte impregnation)
3 Lithium metal negative electrode
4 Gasket
5 Positive electrode can
6 Negative electrode can

The invention claimed is:

1. A positive electrode active material for a nonaqueous electrolyte secondary battery comprising a lithium nickel composite oxide represented by composition formula (1):

$Li_bNi_{1-a}M1_aO_2$, where M1 represents at least one kind of element selected from transition metal elements other than Ni, group 2 elements, and group 13 elements, $0.01 \leq a \leq 0.5$, and $0.85 \leq b \leq 1.05$, wherein the lithium nickel composite oxide has a specific surface area in a range of 0.5 m²/g to 2.05 m²/g, a carbon content of 0.01% by mass or more and 0.08% by mass or less with respect to a total amount of the lithium nickel composite oxide, and a lithium amount of a lithium compound present on a surface of the lithium nickel composite oxide is 0.01% by mass or more and 0.10% by mass or less with respect to the total amount of the lithium nickel composite oxide.

2. The positive electrode active material for a nonaqueous electrolyte secondary battery according to claim 1, wherein a moisture content of the lithium nickel composite oxide powder is 0.2% by mass or less.

3. The positive electrode active material for a nonaqueous electrolyte secondary battery according to claim 1, wherein the composition formula (1) is a composition formula (2):

$Li_bNi_{1-x-y-z}Co_xAl_yM2_zO_2$, where M2 represents at least one kind of element selected from a group of Mn, Ti, Ca and Mg, $0.85 \leq b \leq 1.05$, $0.05 \leq x \leq 0.30$, $0.01 \leq y \leq 0.1$, and z is $0 \leq z \leq 0.05$.

4. The positive electrode active material for a nonaqueous electrolyte secondary battery according to claim 1, wherein the carbon content is in a range of 0.01% by mass to 0.04% by mass.

5. The positive electrode active material for a nonaqueous electrolyte secondary battery according to claim 1, wherein the lithium amount is a mass ratio of lithium to the lithium nickel composite oxide determined by adding the lithium nickel composite oxide to solution to make a slurry, after which an amount of alkali content in the slurry is found by titration with acid using pH of the slurry as an index, and then performing lithium conversion from the amount of alkali content.

6. The positive electrode active material for a nonaqueous electrolyte secondary battery according to claim 5, wherein the acid used for the titration is at least one selected from a group consisting of hydrochloric acid, sulfuric acid, nitric acid, and organic acid.

7. A nonaqueous electrolyte secondary battery comprising a positive electrode, a negative electrode, a separator interposed between the positive electrode and the negative electrode, and a nonaqueous electrolyte, wherein the positive electrode active material according to claim 1 is used as a positive electrode material of the positive electrode.

* * * * *